Patented June 7, 1927.

1,631,865

UNITED STATES PATENT OFFICE.

RICHARD HERZ, OF FRANKFORT-ON-THE-MAIN, GERMANY, ASSIGNOR TO GRASSELLI DYESTUFF CORPORATION, OF NEW YORK, N. Y., A CORPORATION OF DELAWARE.

VIOLET VAT DYESTUFF OF THE 2-THIONAPHTHENE-2-INDOLINDIGO SERIES.

No Drawing. Application filed August 5, 1926, Serial No. 127,473, and in Germany November 6, 1924.

The United States application Serial No. 87,676, filed on February 11th, 1926, relates to new violet vat dyestuffs of the 2-thionaphthene-2-indolindigo series corresponding probably to the general formula:

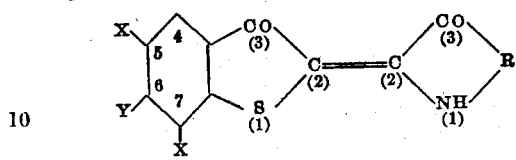

wherein X means a halogen or an alkylgroup, Y means hydrogen, which may be substituted by a halogen or an alkylgroup and R means an arylresidue, which may contain further substituents.

My present invention relates to certain embodiments of the above mentioned series of dyestuffs of which the following are illustrative examples in which the parts are by weight and all temperatures are in centigrade degrees:

Example 1.

(a) 70 parts of 4-methyl-5.7-dichloro-oxythionaphthene are suspended in about 600 parts of chlorobenzene and a solution of 5.7-dichloro-α-isatinchloride in the same solvent is added, which latter solution may be prepared by heating 72 parts of 5.7-dichloroisatin with 72 parts of phosphorus pentachloride in 600 parts of chlorobenzene. The mixture is heated for some time at 60–70°. The separated dyestuffs is filtered, washed and dried.

The new dyestuff, having probably the formula:

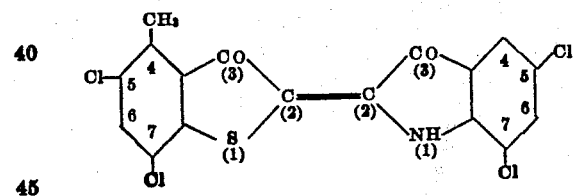

is, when dry, a reddish violet powder, soluble in concentrated sulfuric acid with a greenish blue color, forming with alkaline hydrosulfite a yellow vat, from which cotton and wool is dyed pure bluish violet shades of an excellent fastness to washing, chlorine and light. Beside its excellent dyeing properties the dyestuff is particularly well adapted for printing purposes.

The above named 4-methyl-5.7-dichloro-oxythionaphthene, melting in a pure state at about 135°, may be obtained according to the general methods of production, as, for example, according to the method described in the application No. 87,676. An advantageous process for its manufacture is the following:

1-methyl-3-amino-4.6-dichlorobenzene is diazotized, the diazogroup is replaced by the xanthogen group according to Leuckhardt's reaction, the xanthic acid ester thus formed is saponified to the corresponding mercaptan, and the latter is condensed with monochloroacetic acid, forming the 1-methyl-4.6-dichlorophenyl-3-thioglycollic acid, melting in a pure state at about 106°.

For the production of the 4-methyl-5.7-dichloro-oxythionaphthene this 1-methyl-4.6-dichlorophenyl-3-thioglycollic acid is either treated at low temperatures with suitable acid condensing agents, preferably with chlorosulfonic acid in the cold, or the thioglycollic acid may be converted into the corresponding chloride for instance by heating it with phosphorus trichloride or thionylchloride and the ring is then formed by means of suitable condensing agents, particularly by means of aluminiumchloride, phosphorus pentoxide etc.

This latter process has the advantage, that for the production of the dyestuff the formed 4-methyl-5.7-dichlorooxythionaphthene need not be isolated.

One may, for instance, advantageously work as follows:

(b) 8 parts of the above mentioned 1-methyl-4.6-dichlorobenzene-3-thioglycollic acid are mixed with 25 parts of chlorobenzene, then 10 parts of phosphorus trichloride are added and the mixture is heated at about 115° for some hours. The conversion of the thioglycollic acid into its chloride is finished, when the whole mass is gone into solution. It is cooled down to about 10° and 10 parts of anhydrous aluminium chloride are slowly added. The condensation reaction takes place with an evolution of hydrochloric acid, and is completed by warming the solution at 40° for a short time. Then a solution of 8,4 parts of 5.7-dichloro-α-isatinchloride, prepared as described above, is allowed to run in while stirring. The formation of the dyestuffs begins at once and is finished by heating the mixture at about 90° for some time. Then chlorobenzene is distilled off and the residue is decomposed with ice water. The separated dyestuff is filtered, washed and dried.

The same dyestuff is obtained if, instead of 5.7-dichloro-α-isatinchloride, a 5.7-dichloro-α-isatinarylide is used.

Similar dyestuffs are formed when condensing other α-isatinbodies, such as 5.7-dibromo-α-isatinchloride or arylide or a 6-chloro-7-methyl-α-isatinarylide with the aforesaid 4-methyl-5.7-dichlorooxythionaphthene.

*Example 2.*

If in Example 1 (a) the 4-methyl-5.7-dichlorooxythionaphthene is replaced by the corresponding amount of 4-methyl-5.6.7-trichlorooxythionaphthene and otherwise is worked as described above, then a dyestuff is formed, having probably the formula:

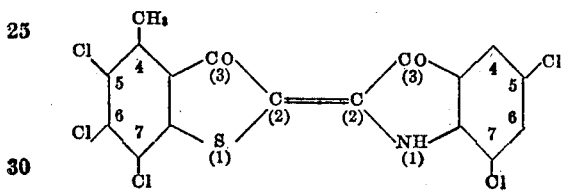

which is very similar in its properties to the dyestuff, described in Example 1.

Also in this case instead of 5.7-dichloro-2-isatinchloride or -arylide 5.7-dibromo-α-isatinchloride or -arylide or other α-isatin bodies may be used.

The aforesaid 4-methyl-5.6.7-trichlorooxythionaphthene may be obtained according to the above described methods of production, starting from 1-methyl-3-amino-4.5.6-trichlorobenzene or it also advantageously may be produced according to the processes described in the British specifications No. 17,417 of 1914 and No. 18,292 of 1914, starting from 1-methyl-2-amino-4.6-dichloro or -4.5.6-trichlorobenzene.

Similar dyestuffs with the same excellent dyeing properties are obtained, if for instance 4-ethyl-5.7-dichlorooxythionaphthene or 4.7-dimethyl-5-chlorooxythionaphthene are condensed with 2-isatin-bodies.

I claim:—

1. As new compounds violet vat dyestuffs of the 2-thionaphthene-2-indolindigo series corresponding probably to the general formula:

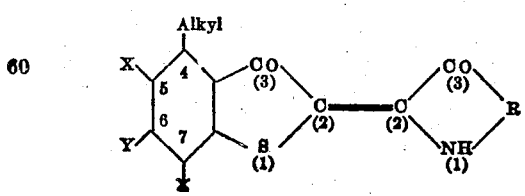

wherein X means a halogen or an alkylgroup, Y means hydrogen, which may be substituted by a halogen or an alkylgroup and R means an arylresidue, which may contain further substituents, which dyestuffs are, when dry, violet powders, soluble in concentrated sulfuric acid to a greenish to blue solution, forming with alkaline hydrosulfite a yellowish vat, from which cotton and wool is dyed in violet to bluish violet shades of an excellent fastness especially to washing, chlorine and light, which dyestuffs are substantially identical with the dyestuffs, obtainable by condensing oxythionaphthene derivatives, corresponding probably to the general formula:

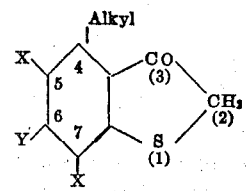

wherein X means a halogen or an alkylgroup, Y means hydrogen which may be substituted by a halogen or an alkylgroup, with an α-isatin body of the general formula:

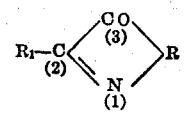

wherein R means an arylresidue, which may contain further substituents, $R_1$ means a halogen or an arylidogroup.

2. As new compounds violet vat dyestuffs of the 2-thionaphthene-2-indolindigo series corresponding probably to the general formula:

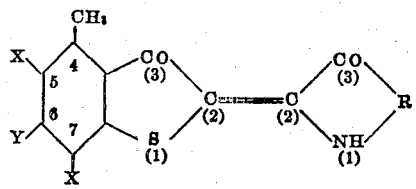

wherein X means a halogen or an alkylgroup, Y means hyrdogen, which may be substituted by a halogen or an alkylgroup and R means an arylresidue, which may contain further substituents, which dyestuffs are, when dry, violet powders, soluble in concentrated sulfuric acid to a greenish to blue solution, forming with alkaline hydrosulfite a yellowish vat, from which cotton and wool are dyed in violet to bluish violet shades of an excellent fastness especially to washing, chlorine and light, which dyestuffs are substantially identical with the dyestuffs, obtainable by condensing oxythionaphthene derivatives, corresponding probably to the general formula:

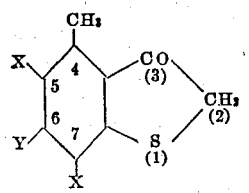

wherein X means a halogen or an alkylgroup, Y means hydrogen, which may be substituted by a halogen or an alkylgroup, with an α-isatin body of the general formula:

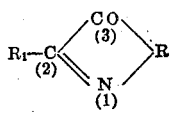

wherein R means an arylresidue, which may contain further substituents, $R_1$ means a halogen or an arylidogroup.

3. As new compounds violet vat dyestuffs of the 2-thionaphthene-2-indolindigo series, corresponding probably to the formula:

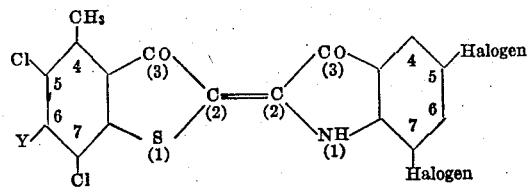

wherein Y means hydrogen which may be substituted by a halogen or an alkyl group; which are, when dry, reddish violet powders, soluble in concentrated sulfuric acid to a greenish blue solution, forming with alkaline hydrosulfite a yellow vat, from which cotton and wool is dyed pure bluish violet shades of an excellent fastness especially to washing, chlorine and light; which dyestuffs are substantially identical with the dyestuffs obtainable by condensing 4-methyl-5.7-dichlorooxythionaphthene of the formula:

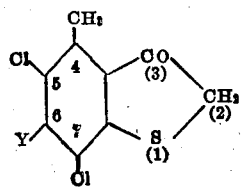

with an α-istin body of the formula:

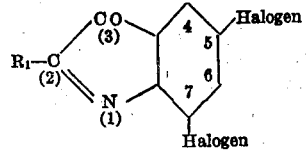

wherein $R_1$ means a halogen or an arylidogroup.

4. As new compounds violet vat dyestuffs of the 2-thionaphthene-2-indolindigo series corresponding probably to the formula:

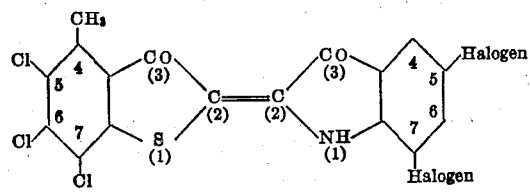

which are, when dry, reddish violet powders, soluble in concentrated sulfuric acid to a greenish blue solution, forming with alkaline hydrosulfite a yellow vat, from which cotton and wool is dyed pure bluish violet shades of an excellent fastness especially to washing, chlorine and light, which dyestuffs are substantially identical with the dyestuffs obtainable by condensing 4-methyl-5.6.7-trichlorooxythionaphthene of the formula:

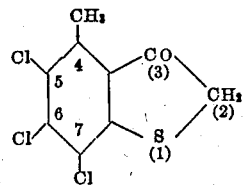

with an α-isatin body of the formula:

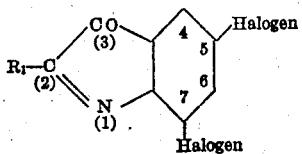

wherein $R_1$ means a halogen or an arylidogroup.

In testimony whereof, I affix my signature.

RICHARD HERZ.